United States Patent
Sitz

[15] 3,700,180
[45] Oct. 24, 1972

[54] CABLE WINDING APPARATUS
[72] Inventor: Tilbert C. Sitz, Richardson, Tex.
[73] Assignee: Collins Radio Company, Dallas, Tex.
[22] Filed: May 11, 1971
[21] Appl. No.: 142,194

[52] U.S. Cl. ..................242/54 A, 242/3, 242/85, 343/877
[51] Int. Cl. .............................................B65h 75/34
[58] Field of Search ......242/54 A, 84.21 W, 2, 3, 85, 242/7.14; 156/170, 186, 189, 443, 445; 343/877, 707

[56] References Cited

UNITED STATES PATENTS 2,496,890  2/1950  Peterson..................242/54 A
2,518,967  8/1950  Witt..........................242/2 X

FOREIGN PATENTS OR APPLICATIONS 884,215  4/1943  France...............242/84.21 W
306,208  6/1955  Switzerland...............343/877

Primary Examiner—Billy S. Taylor
Attorney—Henry K. Woodward and Robert J. Crawford

[57] ABSTRACT

Apparatus for winding cable and the like including a spherically shaped reel, a hollow drive shaft extending through said reel, and a winding arm fastened to a free end of the drive shaft for receiving cable through the drive shaft and winding or unwinding the cable on the reel. Torque governing means is provided to control cable tension during winding and unwinding operation.

7 Claims, 6 Drawing Figures

PATENTED OCT 24 1972 3,700,180

INVENTOR
GILBERT C. SITZ
BY H. K. Woodward
ATTORNEY

INVENTOR
GILBERT C. SITZ
BY  H.K. Woodward
ATTORNEY

CABLE WINDING APPARATUS

This invention relates to winding apparatus, and more particularly to apparatus for winding cable or the like and especially suited for accommodating airborne radio transmitter antennas.

In airborne radio transmitters for operating in the LF–VLF frequency range, a trailing wire is unreeled from inside the aircraft and serves as the transmitter antenna. The length of the trailing wire is approximately one-half the operating frequency wavelength as terminal voltage on the antenna during transmission of radio waves is minimized under such conditions, as is well known in the art. Since the VLF range begins at 10 kilohertz which is a wavelength of 30,000 meters, it will be appreciated that the antenna is very much longer than the aircraft.

Because of the length of wire employed in such transmitters, suitable reel means for accommodating the wire is needed. Heretofore, a cylindrical reel means has been employed with some success, but such an apparatus has speed limitations and presents braking problems due to the amount of kinetic energy associated with its use. Furthermore, during the reeling cycle, proper storage of the cable on the reel requires that cable diameter be maintained within very close limits. With presently used equipment diameter variations beyond these limits will result in mis-spooling. A reeling means that will circumvent this limitation will allow more cycles of operation for a given cable.

Thus, the need exists for reel means or winding apparatus which may be operated faster in reeling and unreeling a heavy load such as the described antenna, and which presents less kinetic energy in operation. The need also exists for a storage device which will allow an increased number of "wind-unwind" cycles while reducing or eliminating the occurrence of a "misspool."

Machines for winding cord-like members on a spherical bobbin are known in the art. Typically, such machines are found in the textile industry for winding yarn, as described in U.S. Pat. No. 2,901,190, or in pressure vessel manufacturing as described in U.S. Pat. No. 2,966,935. As exemplified by these patents, a rotatable spherical spool receives the cord member from an arm exterior to the sphere which is rotated about the sphere. Such machines, however, are not designed for rapid winding and unwinding of the cord.

Accordingly, an object of this invention is an improved reel apparatus.

Another object of the invention is winding apparatus for rapidly winding and unwinding a wire.

Still another object of the invention is an improved winding apparatus for use with an airborne LF–VLF antenna which presents less kinetic energy in operation.

Another object of the invention is to provide a means of wire storage which is more or less independent of wire diameter and/or changes in wire diameter.

Still another object of the invention is an improved means for control of the cable tension during both the winding and unwinding operation.

Features of the invention include a spherically shaped reel and a support means for rotatably receiving said reel. A hollow drive shaft extends through said support means and through said reel with a free end extending above said reel. A hollow winding arm is fastened to said free end of said drive shaft and is rotatable about said reel. Drive means and coupling means are provided to said drive shaft and to said reel whereby said reel is rotated an increment for each complete revolution of said winding arm.

These and other objects and features of the invention will be more readily apparent from the following detail description and appended claims when taken with the drawings, in which:

Figure 1:
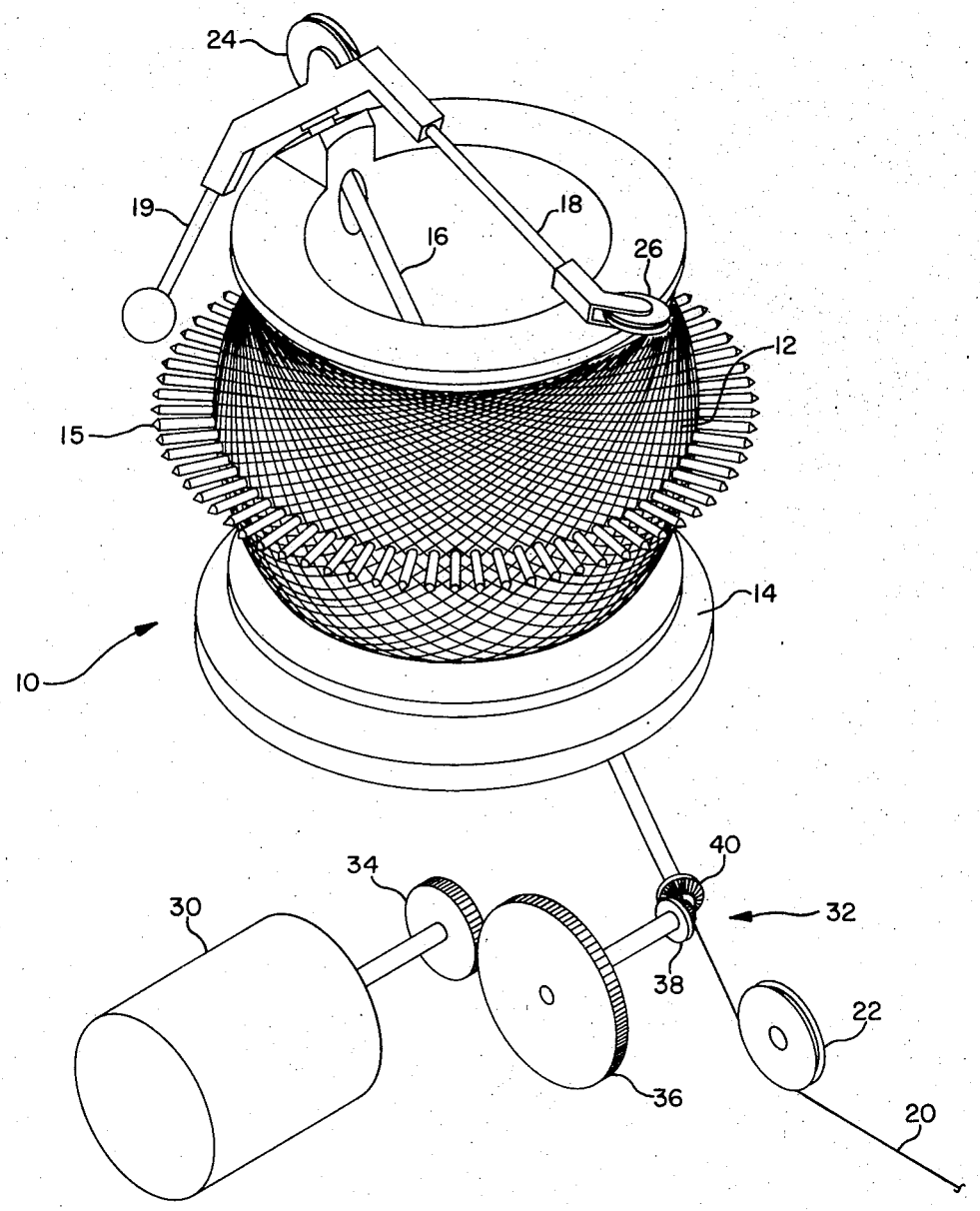
FIG. 1 is a perspective view of winding apparatus in accordance with the present invention.

Referring now to the drawings, FIG. 1 is a perspective view of one illustrative embodiment of the winding apparatus in accordance with the present invention. Shown generally at 10 is the wire accommodating portion of said apparatus and includes a spherically shaped reel 12 which is rotatably mounted on a support member 14. As used herein, the term "spherically shaped" includes a truncated sphere. Mounted around the diametral perimeter of reel 12 are a plurality of protruding guideposts 15 which guide and maintain relative positions of the coils wound on the reel.

A drive shaft 16 extends generally diagonally up and through support member 14 and reel 12 and is supported at either end of the support member by suitable bearing means. Mounted on the upper end of drive shaft 16 is a winding arm 18, which directs a wire or like member as it is wound on or unwound from the reel, and a counterbalance member 19. Both drive shaft 16 and winding arm 18 are hollow in this embodiment thereby accommodating a wire therethrough.

A wire 20 is passed over guide roller 22 into the hollow portion of drive shaft 16 for winding on the reel. The wire passes up through drive shaft 16, over roller 24, and into the hollow portion of winding arm 18. The wire emerges from winding arm 18, passes over a rotatably mounted roller 26, and then onto the reel 12.

Drive motor 30 provides power to the winding apparatus through the gear train shown generally at 32. Spur gears 34 and 36 of gear train 32 provide desired speed reduction of the drive motor, and bevel gears 38 and 40 couple the drive motor to drive shaft 16. Suitable gear arrangements are provided within support means 14, as will be described further below, whereby reel 12 moves one complete revolution for every 105 revolutions of winding arm 26 (assuming 105 guideposts). Expressed differently, reel 12 is indexed one increment (1/105 revolution) for each revolution of winding arm 18 thereby indexing each coil of wire on the reel 12 to the succeeding guidepost. Since the number of posts and spaces are odd, a space is available when the winding arm is rotated 180° or one-half revolution.

Figure 2:
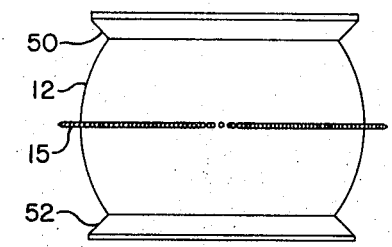
FIG. 2 is a plan view of a spherically shaped reel embodied in the apparatus of FIG. 1.

FIG. 2 is a plan view of the reel portion 12 of the winding apparatus illustrated in FIG. 1. The wire coils are wound generally along great circles about the spherically shaped central portion of the reel with upper and lower flange portions 50 and 52 providing support for the coils. As described above, the reel is indexed one increment for each revolution of the winding arm thereby indexing succeeding coils along the guideposts 15.

Figure 3:
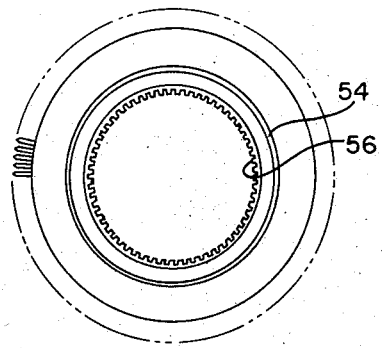
FIG. 3 is a bottom view of the reel of FIG. 2 and illustrates gear arrangements within said reel.

Referring now to the bottom view of the reel 12 illustrated in FIG. 3, it will be noted that a bearing ring 54 is provided for supporting the reel on support member 14. Internal gear 56 is provided for receiving power from the drive shaft 16 through the gear train arrangement illustrated in FIGS. 4 and 5.

Figure 4:
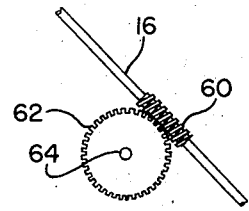
FIG. 4 is a plan view of a gear arrangement on the drive shaft of the apparatus of FIG. 1.

With reference to FIG. 4, a portion of the drive shaft 16 within the support means 14 is provided with a worm gear 60 which drives bevel gear 62 on shaft 64. Shaft 64 transmits power from drive shaft 16 through a suitable gear arrangement to the reel 12, as illustrated in FIG. 5.

Figure 5:
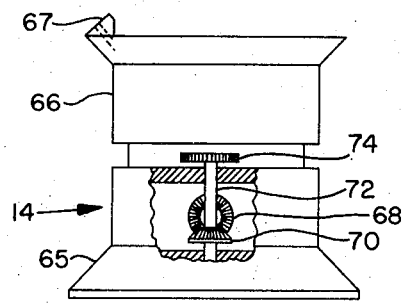
FIG. 5 is a plan view partially in section of the support means for said reel of the apparatus of FIG. 1 and further illustrates a gear arrangement.

FIG. 5 shows partially in section the support means 14 and the remaining portion of the gear train which provides motion to reel 12. Support means 14 comprises a pedestal portion 65 and insertion member 66 which fastens to pedestal 65 and screws or like fasteners to maintain the reel member thereon.

Shaft 64 illustrated in FIG. 4 also accommodates bevel gear 68 which drives a cooperative bevel gear 70 mounted on shaft 72. At the upper end of shaft 72 is a spur gear 74 which mates with the internal gear 56 of the reel 12, illustrated in FIG. 3. Thus, in operation drive motor 30 provides power for drive shaft 16 through means of gear train 32, as illustrated in FIG. 1. As winding arm 18 is revolved about the reel 12, thereby winding or unwinding wire from reel 12, the internal gear train arrangement illustrated in FIGS. 3, 4, and 5 provide rotary motion for reel 12 whereby coils of wire are indexed around the reel 12.

Since the relatively large mass of the loaded spool is moved at only an increment of the speed of winding arm 18, it will be appreciated that considerably less kinetic energy is involved than with a revolving cylindrical type spool. Further, the provision of the hollow drive shaft through the support member and reel minimizes the space requirements required for the winding apparatus, which is a critical requirement in airborne applications.

Figure 6:
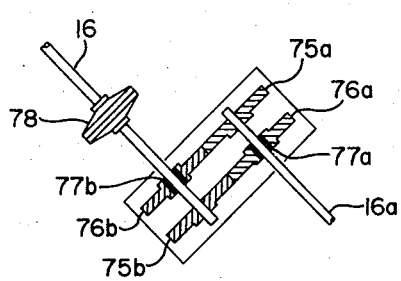
FIG. 6 is a sectional view of a speed changer and torque control that changes speed ratios between two shafts and is direction of motion sensitive.

FIG. 6 is a sectional view of a constant torque device which is advantageously inserted into the drive shaft 16 to control cable tension during winding and unwinding operation. Shaft 16 is broken and offset to 16a with gears 75, 76, one-way clutch 77, and slip clutch 78 used as a connecting means. Subscripts a and b are used for purposes of operating description. Shaft 16a rotated in a clockwise direction engages one-way clutch 77a driving gear 76a. Gear 75a is fixed to shaft 16a and drives gear 77b. Gear 76 is slightly larger than gear 75. With the above notation and gear ratios, shaft 16 is driven at a rotational speed slightly greater than gear 76b and clutch 77b is overrun. Assuming that cable is fed through tube 16 from a tension reducing device, such as a capstan, at a constant speed and that prior to the introduction of the device shown in FIG. 5, the length of cable applied to the reel was the same as that wrapped on the reel; the winding arm will now attempt to wrap more wire onto the reel than the capstan will release. As a result clutch 78, having a preset torque capability, will be made to slip resulting in a controlled tension in the cable being wrapped. A reversal in the direction of rotation will cause clutch 77b to engage and clutch 77a to overrun. As a result the capstan will now try to remove more cable than the winding arm will release. As a result clutch 78 must now slip in the opposite direction and again transmitting same preset torque and result in the same cable tension with, however, a reversal in the direction of cable translation.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

I claim:

1. Winding apparatus comprising:
   a. a spherically shaped reel;
   b. support means for rotatably receiving said reel;
   c. a hollow drive shaft extending through said support means and through said reel with a free end extending above said reel;
   d. a winding arm fastened to said free end of said drive shaft and rotatable about said reel;
   e. drive means;
   f. first means for coupling said drive means to said drive shaft; and
   g. second means for coupling said drive means to said reel whereby said reel is rotated an increment for each complete revolution of said winding arm.

2. Winding apparatus in accordance with claim 1 wherein said reel includes a plurality of guideposts projectingly mounted about a diametral perimeter thereof.

3. Winding apparatus in accordance with claim 2 wherein said reel is rotated an increment equal to the spacing between adjacent guideposts for each complete revolution of said winding arm.

4. Winding apparatus in accordance with claim 3 wherein said support means includes a pedestal member for receiving the lower point of said reel and an insert portion for positioning in the upper part of said reel for fastening said reel to said pedestal member.

5. Winding apparatus in accordance with claim 3 wherein said second means for coupling includes a gear train within said support means for coupling said drive shaft to said reel.

6. Winding apparatus in accordance with claim 1 wherein said first means comprises torque governing means which provides the same torque between said drive means and said drive shaft in both wind and unwind operations.

7. Winding apparatus in accordance with claim 6 wherein said torque governing means comprises one-way clutch means coupled to said drive means and slip clutch means coupling said one-way clutch means to said drive shaft.

* * * * *